Figure 1:
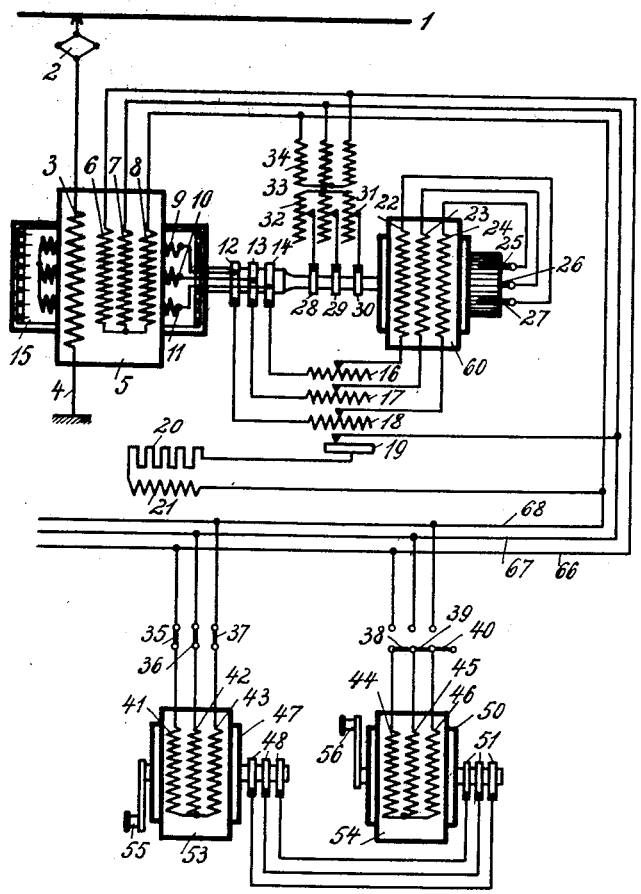

May 15, 1928.                                            1,669,576
M. SCHENKEL
ROTARY PHASE CONVERTER FOR CONVERTING ALTERNATING CURRENT
Filed July 23, 1925        2 Sheets-Sheet 1

INVENTOR
*Moritz Schenkel*
BY
*Wesley G. Carr*
ATTORNEY

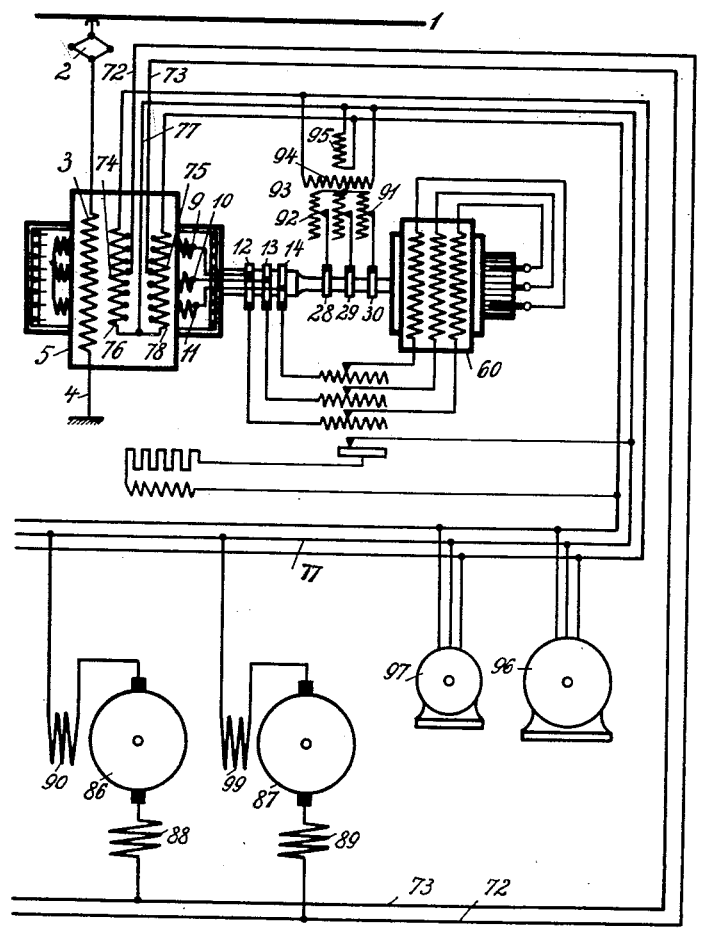

Patented May 15, 1928.

1,669,576

UNITED STATES PATENT OFFICE.

MORITZ SCHENKEL, OF BERLIN-CHARLOTTENBURG, GERMANY, ASSIGNOR TO WESTINGHOUSE ELECTRIC & MANUFACTURING COMPANY, OF NEW YORK, N. Y., A CORPORATION.

ROTARY PHASE CONVERTER FOR CONVERTING ALTERNATING CURRENT.

Application filed July 23, 1925, Serial No. 45,510, and in Germany October 27, 1924.

My invention relates to asynchronously operating rotary phase-converters for converting alternating current of one or more phases to alternating current of a different number of phases.

It is well known that it is possible to operate three-phase or polyphase motors from single-phase systems by means of the so-called Arno connection. This system of connection provides between the single-phase network and the polyphase motors a no-load induction machine which is connected single-phase with the single-phase system and which supplies from a polyphase winding, which may be connected with the single-phase winding as required, polyphase current to the polyphase motors. The missing phases are generated by the rotary field of this machine which is usually provided with a squirrel-cage rotor.

This system of connection which has not been adopted to any considerable extent in the ordinary practice owing to the small number of single-phase systems, has been made use of for the operation of heavy standard gage locomotives and according to it the so-called split phase converter locomotive has been constructed. The reasons for this reside in the following very noteworthy points:

1. The trolley line may consist of a single wire with all the resulting advantages regarding costs, high tension and simple harmless execution in the railway stations and other points, while the useful three-phase motors with their powerful starting torque may be employed.

2. The customary frequencies, such as 40, 50 or 60 may be employed and it is not necessary that the railway company build power stations with frequencies which are not applicable anywhere else and which require very expensive machines and transformers. The railway company has also a larger reserve at its disposal when it is connected with the numerous public power stations. Countries which have small capital at their disposal and yet desire the electrification of their railways are thereby put in a position to carry out their scheme.

3. The motor drive may be easily converted into a generator drive and reliable braking may be effected without difficult change-over.

4. The machines built into the locomotives become of very simple and rugged construction.

It must be admitted that the above four viewpoints are of extraordinary economical importance and therefore a great incentive for the application of the Arno system of connection.

The construction of these locomotives has, however, unfortunately given no satisfaction. This fact may be traced to the following drawbacks which are all connected with the phase converter and its consumption of magnetizing current.

It is obvious without further explanation that the phase-converter must have a certain consumption of magnetizing current as long as it remains in principle a simple induction machine, but beyond this it has also to transmit magnetizing currents into the polyphase motors and inasmuch as these polyphase motors are employed with pole changing or cascade connection very considerable magnetizing currents result in the motors in some of these systems of connection. For this reason the power factor of such an arrangement becomes extraordinary bad and owing to this poor power factor the voltage of the trolley wire drops very considerably in view of its length and its sensitiveness to inductive loads. The tractive power of the polyphase motors and thus their efficiency and continuous output then falls as the square of the voltage owing to the higher current intensity required for generating the necessary tractive efforts when the voltage drops. It has been attempted to eliminate this extraordinary drawback by choosing the air gap of the converter as well as those of the driving motors very small and values of less than one mm. have been adopted for locomotive outputs of 2000 to 3000 kw. By this expedient unfortunately only a small improvement of the power factor was brought about in exchange for the serious disadvantage that all the machines became unreliable in service. It is obvious that small air gaps between the stationary and rotating portions of a converter or motor mounted on a vehicle subject to violent vibrations are sure to impair the service reliability of the machine more than in stationary motors.

For this reason these so-called split phase converter locomotives have not proved successful in spite of the existing economically favorable points in their application.

The object of my invention is to overcome these drawbacks without sacrificing any of the economical advantages. In its application for locomotives my invention represents a solution of the problem of the locomotive drive which up to a single point, which could only be removed by the construction or connection of the driving motors themselves, may be claimed as the perfect solution of the problem of driving locomotives electrically and which for this reason is of extraordinary economical and technical importance. This single remaining point relates to the steady smooth adjustment for any speed. As well known from existing three-phase services it is possible to arrive at rather satisfactory speed conditions when employing pole changing and cascade connections so that the disadvantage of few speed steps between which others are missing is fairly well overcome. It has also been maintained that the existence of certain fixed speeds is not unfavorable for the preparation of the time tables and the adherence to the same so that the above disadvantage is counterbalanced to some extent by some advantages.

The invention consists essentially in the feature that the rotor of the phase converter is wound as a polyphase member and is excited by a separately excited polyphase exciter machine.

Figure 2:
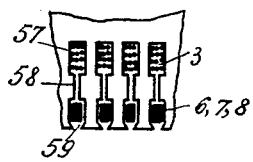

In the drawing:

Fig. 1 is a diagram of an embodiment of my invention,

Fig. 2, a detail and

Fig. 3, a diagram of a slightly modified embodiment of my invention.

Referring to Fig. 1, 1 is the single-phase network or in the case of railway operation the trolley or overhead wire. 2 is a current collector or trolley, 3 the high-tension winding of the rotary phase-converter 5 which is connected to the earth 4. This high-tension winding is located in the stator of the phase-converter 5 and is housed in the same slots with a three-phase winding 6, 7 and 8, as clearly shown in Fig. 2, but in such a manner that a certain leakage can develop between the single-phase and the three-phase winding. For this purpose the slots 57 in which the winding 3 is located and the slots 59 in which the windings 6, 7 and 8 are located are connected by a leakage path 58 designed according to requirements. The rotor or armature of this three-phase converter contains a normal three-phase winding 9, 10 and 11 connected with the slip rings 12, 13 and 14. According to requirements, that is, either for increasing its strength or for facilitating its starting or for reducing the size of the exciter machine to be discussed later on, this rotor may be equipped also with a damping winding 15 of more or less resistance which may be designed either as a short circuited squirrel-cage winding or as a phase wound winding. This damping winding is, however, no particularly essential constituent of the phase-converter. From the slip rings 12, 13 and 14 the current of the rotor winding 9, 10 and 11 is conducted through starters 16, 17 and 18 to a separately energized compensated three-phase exciter machine 60. The construction of this exciter machine is well known. It consists of a stator winding 22, 23 and 24, the ampere turns of which are completely neutralized by a drum armature fed through corresponding brushes 25, 26 and 27. A regulable polyphase transformer 33 is connected to the slip rings 28, 29 and 30 of the same, or another, winding of the drum, and is energized from the terminals of the three-phase stator winding 6, 7 and 8 of the phase converter. The transformer 33, in actual practice, generally regulates both the phase and the magnitude of the voltage applied to the slip rings 28, 29 and 30 and may be assisted by further means, as is well known in the art. For the sake of simplicity in illustration, only the regulation of the magnitude of the voltage is illustrated in the drawing, contacts 31 sliding upon the secondary winding 32 of this transformer 33, the primary winding of which is designated 34.

This finishes the description of the converter with the exception of its starting apparatus which makes use of an artificial phase in the customary manner. For this purpose either a special winding (not shown) may be employed or those phases of the three-phase stator winding 6, 7, 8 which are not in phase-coincidence with the single-phase winding 3 of the phase converter 5. In the illustration it is assumed that the winding 6 is in phase-coincidence with the winding 3. For this reason the other two windings 7 and 8 are utilized as the auxiliary phase when starting the converter. Their current is conducted across a contact 19 through an ohmic resistance 20 and a choke coil 21. The contacts 16, 17, 18 and 19 required for starting are moved together and as shown in the drawing the contact 19 leaves its slide-rail after a certain speed has been attained while the starter still makes contact and only later on reduces its resistance to zero. These methods of starting do not form an essential part of my invention and make use of well known apparatus only. The three-phase winding 6, 7, 8 feeds the polyphase driving motors through the switches 35 to 40. Since it is entirely impossible to illustrate all systems of connection which could be applied to such motors, it has been assumed in the drawing that there exist two motors 53 and 54 which possess the stator windings 41 to 46 and the rotors 47 and 50 with the sets of slip rings 48 and 51. A system of connection is illustrated in which these two motors operate in cascade, that is, the motor 53 is connected with the three-phase network 66, 67 and 68 of the winding 6, 7, 8 by closing the switches 35 to 37. Its rotor 47 is connected with the rotor 50 of the second motor through the slip rings 48 and 51 and the stator winding 44, 45 and 46 of the second motor is cut off from the network and short circuited by changing over the switches 38, 39 and 40. To this cascade connection belongs a mechanical coupling of the two motors which is indicated in the illustration by each of the motors acting through a crank drive 55, 56 upon the driving wheels of the vehicle which by their friction upon the rails effect the mechanical coupling.

The manner of operation of the converter is as follows:

After the rotor of the converter 5 has been started in the customary manner, which need not be described here as this is effected according to well known methods, a rotating field is generated in the converter 5. This rotating field generates the required polyphase voltage in the polyphase winding 6, 7, 8. Thus the three-phase exciter machine 60 receives energy, through the transformer 33, which is transferred to the commutator of the machine and thus through the slip rings 12 to 14 to the rotor winding 9, 10 and 11 of the converter. This rotor winding now takes over the supply of the entire magnetizing current for the converter as well as for the motors, provided care is taken that by adjusting the contacts 31 the required voltage is supplied to the three-phase exciter. This renders the supply of magnetizing current by the trolley line 1 unnecessary and magnetizing current may even be supplied to this line whereby the power factor in the trolley line becomes unity or leading.

If the windings 3, 6, 7 and 8 are interlinked with one another without any leakage, that is, if they are wound into the same slots, the result is that since now the voltage of the trolley wire is practically constant, owing to its power factor being unity, the voltage in the driving motors 53 and 54 is also practically constant. If, however, the leakage path represented by the magnetic bridge 58 in Fig. 2 is placed between the windings 3 and 6, 7, 8 then, in order to obtain unity power factor in the trolley wire at full load, the magnetizing current in the rotor winding 9, 10 and 11 must be increased by the amount of leakage which can develop in the leakage path 58. As this leakage flux previously traverses the slots 59, the winding 6 to 8 is accordingly affected by a stronger magnetic flux. The voltage at the motors 53 and 54 must consequently grow, that means, if the machine has the leakage path 58 and if the power factor in the trolley wire is set at unity by means of the contact 31 then the driving motors receive a voltage increased in accordance with the amount of leakage and thus run under considerably more favorable conditions at full load. As a matter of course the same system may be employed to convert polyphase current to other polyphase current, for which purpose it is merely necessary to design the winding 3 as a polyphase winding similar to the winding 6 to 8.

The advantages of my invention, especially when applied to locomotive service, are the following:

It employs a single-phase line for the service. The phase converter employed in connection with a three-phase exciter machine is so constituted that the trolley-line current is always of unity or leading power factor. Thus, the conditions may be so adjusted that a coasting locomotive or a locomotive running with low tractive effort may even supply leading current into the single-phase network. This is connected with the fact that the magnetizing currents are generated within the phase converter itself. This renders it possible that the magnetizing currents for the motors may be withdrawn from the phase converter of any desired, almost unlimited, magnitude and thus it follows that the converters and motors may be constructed with air gaps which are suitable for railway operation and which produce reliable service conditions, air gaps of 3 mm., for instance, having proved entirely satisfactory for such locomotives in other systems. Furthermore, the possibility of producing any desired magnetizing currents offers the advantage that the voltage in the motors may be increased at higher loads and thus their continuous output and efficiency may always be brought to the most favorable value for the time being. If the power is withdrawn from the trolley wire at a power factor of unity or even leading, the question of a substantial voltage drop does not arise and the vehicles may on the contrary assist in the maintenance of the voltage. The phase converter may easily be designed for the high voltages of 15000 volts now customary for single-phase service as will be described further on.

Special attention is called to the asynchronous character of this phase converter. Arrangements have already been disclosed, for locomotives also, in which a synchronous phase converter is employed the rotor of which carries a pole winding which is excited by continuous current. The application of such a synchronous converter has great disadvantages which mainly reside in the unreliability of service of synchronous machines. In itself the starting of synchronous machines is difficult, but even if this difficulty were overcome by the provision of damper windings or self-starter windings, the difficulties remain which arise in the operation of the synchronous converter and which are connected with the fluctuations in the voltage as well as in the frequency of the trolley wire. Both cause hunting and falling out of step, resulting in disturbances of the service and high current surges. The difficulties just mentioned are overcome by my asynchronous compensated phase converter because, owing to its asynchronous operation, it is sensitive neither to voltage fluctuations nor to frequency fluctuations and cannot hunt. A further advantage of this asynchronous operation resides in the fact that, during the starting period, the locomotive energy is withdrawn from the mass of the rotor of the converter, owing to the increasing slip during this period.

If, now, as specified in the described embodiment of my invention, induction motors are fed from the phase converter, only a few speed steps are obtained, if the regulation of the induction motors is effected by pole changing or cascade changing.

This drawback may be removed by equipping the phase converter with one or a plurality of changeable secondary windings from which different voltages may be withdrawn. Instead of the induction motors, motors are then employed the speed of which depends upon the voltage supplied, for electric locomotives for instance, the well known single phase commutator motors. These are, then, as a matter of course, not designed for the frequency 50 but for a lower frequency and their speed is regulated by the step-by-step regulation at the secondary winding of the phase converter.

The speed regulation may be accomplished in still finer steps by changing the speed between the coarse steps by varying the strength of the field of the converter as already pointed out. This construction will now be more particularly described.

It is in itself immaterial how many secondary windings with taps are provided in the converter. A single secondary winding may be employed or a plurality of windings of differently placed phases. In any case the rotary field must be developed as perfectly as possible by the exciter machine of the converter so that the three-phase exciter machine itself can always be connected with a winding, if desired, a special winding, in the converter supplying polyphase current. This polyphase winding may either be a separate winding wound in the stator of the converter, in which case it may have any phase number which differs from the other windings, or it may be combined with the windings provided for the operation of the motors, under certain circumstances, with the assistance of a special phase transformation, with any means known for the purpose.

In Fig. 3 is shown an embodiment of the modifications just mentioned, wherein the secondary member of the converter is a two-phase winding 76, 78. The single-phase motors can preferably be divided in several groups, groups of even number occuring most frequently. Vehicles having two or four motors will thus be provided with a two-phase system and vehicles with three motors with a three-phase system. As shown in Fig. 3, the two-phase secondary winding 76, 78 is provided with taps with slidable contacts on each of the two phases which are designated 74 and 75 and which lead to two lines 72 and 73. From these two lines the single-phase commutator motors 86 and 87 are fed with the assistance of the line 77. These motors are equipped with compensation windings 88 and 89 as well as exciter windings 90 and 99. Switches have been omitted for the sake of clearness. If the contacts 74 and 75 on the converter windings 76, 78 are moved, the voltage at the motors 86 and 87 is regulated in coarse steps.

The three-phase exciter 60 is permanently connected to the two-phase network 76, 77, 78 by means of a transformer 93 having a secondary winding 92 which is provided with regulating contacts 91 connected to the slip rings 28, 29, 30 of the exciter. The exciter thus receives a voltage which, during the process of regulation, is not quite constant but is less changed than the voltage applied to the motors 86 and 87, which are energized from the network 72, 73, 77. In the modification shown in Fig. 3, the conversion from two-phase current to three-phase current is accomplished by means of a Scott transformer the secondary winding 92 of which is three-phase while the primary winding is two-phase, as indicated at 94 and 95.

The two-phase line 76, 77, 78, to which the transformer 93 is connected supplies a practically constant voltage which may be utilized for still other machines which are necessary in the locomotive for ventilation or for the generation of compressed air and which need not be regulable. This is indicated by way of example by two-phase motors 96 and 97.

The process of regulation is as follows: The contacts 74 and 75 are adjusted to the taps which most nearly give the desired starting voltage, such voltage being somewhat less than one-half of the voltage which will ultimately be attained. The excitation of the converter is then strengthened by means of the switch 91 in the manner described in connection with Fig. 1, so that the voltage at the contacts 74 and 75 is somewhat increased. When the voltage attained in this manner closely approaches that which the next of the main contacts 74 and 75 would give, the voltage is first slightly reduced again by the aid of the contacts 91. The contacts 74 and 75 are then displaced by one step, and thereafter the voltage can again be raised by strengthening the excitation of the converter. It is thus possible to supply to the motors 86 and 87 a voltage regulated in very fine steps. It will always be attempted to adjust the voltage not only by means of the contacts at the secondary winding of the converter 5 but by stronger excitation of the converter also in order to attain always if possible a good power factor in the trolley wire.

It will be understood that the invention may be modified in various ways without departing from its spirit or scope and I desire that it be limited by the state of the art only.

I claim as my invention:—

1. An asynchronous converter set comprising a main converter machine of the induction-motor type, the same comprising a slotted stator member having a primary winding in deeply buried slots and a tertiary winding in less deep slots and a rotor member having a secondary winding, incoming and outgoing power lines connected to said primary and tertiary windings, respectively, and auxiliary means associated with said secondary winding for supplying thereto a wattless alternating current component of sufficient magnitude to substantially overcome the magnetizing currents in the converter set.

2. An asynchronous converter set comprising a main converter machine of the induction-motor type, the same comprising a slotted stator member having a primary winding in deeply buried slots and a tertiary winding in less deep slots and a rotor member having a secondary winding, incoming and outgoing power lines connected to said primary and tertiary windings, respectively, an auxiliary compensated separately energized alternating-current commutator-type frequency converter connected to said secondary winding, and means for adjusting said auxiliary converter.

3. An asynchronous converter set comprising a main converter machine of the induction-motor type, the same comprising a slotted stator member having a single-phase primary winding in deeply buried slots and a polyphase tertiary winding in less deep slots and a rotor member having a secondary winding, incoming and outgoing power lines connected to said primary and tertiary windings, respectively, an auxiliary compensated separately energized alternating-current commutator-type frequency converter electrically and mechanically connected to said rotor member, and means for adjusting said auxiliary converter.

4. An asynchronous converter set comprising a main converter machine of the induction-motor type, the same comprising a slotted stator member having a primary winding in deeply buried slots and a tertiary winding in less deep slots and a rotor member having a secondary winding, incoming and outgoing power lines connected to said primary and tertiary windings, respectively, auxiliary means associated with said secondary winding for supplying thereto a wattless alternating current component of sufficient magnitude to substantially overcome the magnetizing currents in the converter set, means for regulating, in coarse steps, the voltage of the outgoing power lines connected with said tertiary windings, and means for closely regulating the wattless current components supplied by the auxiliary means.

5. An asynchronous converter set comprising a main converter machine of the induction-motor type, the same comprising a slotted stator member having a primary winding in deeply buried slots and a tertiary winding in less deep slots and a rotor member having a secondary winding, incoming and outgoing power lines connected to said primary and tertiary windings, respectively, an auxiliary compensated separately energized alternating-current commutator-type frequency converter connected to said secondary winding, means for regulating, in coarse steps, the voltage of the outgoing power lines connected with said tertiary windings, and means for closely regulating the auxiliary converter.

6. An asynchronous converter set comprising a main converter machine of the induction-motor type, the same comprising a slotted stator member having a single-phase primary winding in deeply buried slots and a polyphase tertiary winding in less deep slots and a rotor member having a secondary winding, single-phase and polyphase power lines connected to said primary and tertiary windings, respectively, an auxiliary compensated separately energized alternating-current commutator-type frequency converter electrically and mechanically connected to said rotor member, means for regulating, in coarse steps, the voltage of the polyphase power lines connected with said tertiary windings, and means for closely regulating the auxiliary converter.

In testimony whereof I affix my signature.

MORITZ SCHENKEL.